(12) United States Patent
Zhang et al.

(10) Patent No.: US 9,233,432 B2
(45) Date of Patent: Jan. 12, 2016

(54) ARC WELDER AND RELATED SYSTEM

(75) Inventors: YuMing Zhang, Lexington, KY (US);
Kehai Li, Florence, SC (US)

(73) Assignee: Yu Ming Zhang, Lexington, KY (US)

( * ) Notice: Subject to any disclaimer, the term of this patent is extended or adjusted under 35 U.S.C. 154(b) by 2437 days.

(21) Appl. No.: 12/028,958

(22) Filed: Feb. 11, 2008

(65) Prior Publication Data

US 2008/0190900 A1   Aug. 14, 2008

Related U.S. Application Data

(60) Provisional application No. 60/889,358, filed on Feb. 12, 2007, provisional application No. 60/889,414, filed on Feb. 12, 2007.

(51) Int. Cl.
| | |
|---|---|
| *B23K 9/00* | (2006.01) |
| *B23K 9/167* | (2006.01) |
| *B23K 9/095* | (2006.01) |
| *B23K 9/12* | (2006.01) |
| *B23K 37/00* | (2006.01) |

(52) U.S. Cl.
CPC ............. *B23K 9/1675* (2013.01); *B23K 9/0953* (2013.01); *B23K 9/121* (2013.01); *B23K 37/003* (2013.01)

(58) Field of Classification Search
CPC ...... B23K 37/003; B23K 9/00; B23K 9/0953; B23K 9/121–9/126; B23K 9/167–9/1735
USPC .................. 219/121.45, 136, 137 R, 137 PS, 219/137 WM, 137.2, 137.31, 145.1, 145.21
See application file for complete search history.

(56) References Cited

U.S. PATENT DOCUMENTS

| | | | |
|---|---|---|---|
| 2,847,555 A * | 8/1958 | Yenni | 219/76.15 |
| 3,319,043 A | 5/1967 | Rohrberg | |
| 3,604,889 A | 9/1971 | Rohrberg | |
| 3,649,805 A | 3/1972 | Rohrberg | |
| 4,214,141 A | 7/1980 | Okuda et al. | |
| 4,246,463 A | 1/1981 | Shutt et al. | |
| 4,442,339 A * | 4/1984 | Mizuno et al. | 219/130.33 |
| 4,547,654 A * | 10/1985 | Stol | 219/137 PS |
| 4,806,735 A | 2/1989 | Ditschun et al. | |
| 5,155,330 A | 10/1992 | Fratiello et al. | |
| 6,410,879 B1 | 6/2002 | Schwankhart | |
| 6,469,277 B1 | 10/2002 | Trube et al. | |
| 7,297,900 B2 | 11/2007 | Byerly | |
| 2005/0199593 A1 | 9/2005 | Ignatchenko et al. | |
| 2006/0207983 A1 | 9/2006 | Myers et al. | |
| 2006/0237409 A1 | 10/2006 | Uecker et al. | |
| 2006/0243704 A1 | 11/2006 | Matz et al. | |

OTHER PUBLICATIONS

Lincoln Electric, Waveform Control Technology, AC/DC Submerged Arc Welding, 2006, 6 pgs.

* cited by examiner

*Primary Examiner* — Sang Y Paik
(74) *Attorney, Agent, or Firm* — King & Schickli, PLLC

(57) ABSTRACT

A welder for welding a base metal. The welder may include a first electrode for forming a first arc with the base metal and a second electrode for forming a second arc between the first and second electrodes. A compact welder, welding system, and method are also provided.

14 Claims, 6 Drawing Sheets

ARC WELDER AND RELATED SYSTEM

This application claims the benefit of U.S. Provisional Patent Application No. 60/889,358 filed Feb. 12, 2007, the disclosure of which is herein incorporated by reference, and U.S. Provisional Patent Application No. 60/889,414 filed Feb. 12, 2007, the disclosure of which is herein incorporated by reference.

TECHNICAL FIELD

This invention relates generally to a welding and, more particularly, to an arc welder that enables increased control of the base metal during the welding process. A related, system and method are also disclosed.

BACKGROUND OF THE INVENTION

Welding is ubiquitous in modern manufacturing. Perhaps one of the most popular welding processes for joining metallic materials is arc welding. For instance, gas metal arc welding ("GMAW") normally utilizes a direct current electrode positive polarity in which a wire is connected to the positive terminal of the power source and the power source operates in a constant voltage ("CV") mode. This results in a reverse polarity that contributes to a stable arc, uniform metal transfer, and greater weld penetration. The CV power source can be adjusted to vary the welding current such that the wire melting speed is equal to the given wire feed, speed, so that the welding voltage or arc length is maintained constant.

Many automotive manufacturing facilities utilize automatic or semiautomatic GMAW of metallic automobile components. The productivity for such GMAW is generally determined by the travel speed of the welder/base metal that creates the desired weld profile. Currently, a faster travel speed requires a larger welding wire melting speed, so that there is enough melted metal to form a longer weld bead in a unit time. The melting speed can generally be calculated from the following formula (assuming the metal transfer is in spray mode, i.e., die melting current is greater than 250 amps for mild steels):

$$\dot{m} = 5.1 \times 10^{-13} \frac{I^2 L}{S} + 2.2 \times 10^{-6} I$$

Where $\dot{m}$ (kg/s) is the melting speed, I(A) is the total melting current, L(m) is the wire extension, and S(m$^2$) is the cross-sectional area of the wire. From this formula, it can be seen that the current must be increased in order to increase the melting speed.

Unfortunately, given the current configuration of conventional GMAW, the melting current is the same as the base metal current. Therefore, an increase in the melting current results in an increase in the base metal heat input. In other words, to melt the weld wire faster, one must increase the melting current and the base metal heat input. This increase in base metal heat input results in increased residual stress and distortion in the base metal being welded. For this reason, it is difficult to increase the welding speed for the GMAW process without imposing undesired amounts of heat to the base metal.

While use of tandem, independent GMAW configurations and variable-polarity GMAW systems have had limited success in increasing the melting speed of the welding wire, they are expensive and limited in their weld control. The tandem and variable-polarity systems do not allow for independent control of the base metal heat input, while simultaneously allowing the user to control the melting speed of the weld wire. Also, these systems often require manufacturers to completely replace the welding systems they currently have in place. That is, the conventional GMAW system that a manufacturer would have in place must be replaced with a newly configured tandem or variable-polarity system.

Accordingly, the need exists for an arc welder and related system and method that allow for greater control of the welding process. The welder would enable greater melting speeds of the welding wire, while allowing control of certain aspects of the base metal being welded. The welder, system, and method would also be capable of being used with conventional GMAW systems, thus obviating the need to completely replace existing welding systems.

SUMMARY OF THE INVENTION

In accordance with one aspect, a double-arc, fluid cooled welder for welding a base metal is disclosed. The welder may include a first electrode for forming the first arc with the base metal. Also, the welder may include a second electrode in communication with the fluid for cooling the second electrode. The second electrode may be positioned adjacent to the first electrode for forming the second arc between the first electrode and the second electrode.

In one embodiment, the second electrode substantially surrounds the first electrode. The second electrode may include an aperture for receiving a portion of the first electrode. Also, the second electrode may include a first aperture for receiving the fluid and a second aperture for allowing the fluid to exit the second electrode. The fluid may be a liquid including water and ethylene glycol.

In accordance with another aspect, a welder for welding a base metal is disclosed. The welder may include a first electrode for forming the first arc with the base metal. It may also include a second electrode having a portion that completely surrounds the first electrode. The second electrode may form a second arc with the first electrode.

In one embodiment, at least one of the first and second electrode are in communication with a fluid for cooling the electrode. The second electrode may include an aperture for receiving a fluid. The portion of the second electrode that completely surrounds the first electrode may include an aperture that receives at least a portion of the first electrode. The portion of the second electrode that completely surrounds the first electrode may be substantially circular.

In accordance with another aspect, a welding system is disclosed. The welding system may include a first gas metal arc welder having a first electrode for forming a first arc. It may also include a second gas metal arc welder having a second electrode for forming a second arc between the second electrode and the first electrode, whereby as a result of the second arc, a value of a current through the base metal is less than a value of the current through the first electrode.

The welding system may also include a constant current power supply and a constant voltage power supply. The constant current power supply may provide power to the second gas metal arc welder. The first and second electrodes may be consumable welding wires. In one embodiment, the value of a voltage for the first arc is less than the value of the voltage for the second arc. The value of the voltage, for the second arc may be 1-3 volts greater than the value of the voltage for the first arc.

In accordance with another aspect, a welding system is disclosed. The welding system may include a gas metal arc welder having a first electrode for forming a first arc between the first electrode and a base metal to be welded. The welding system may also include a gas tungsten arc welder having a second electrode for forming a second arc between the second electrode and the first electrode, such that a value of a current through the base metal is less than a value of the current through the first electrode.

In one embodiment, the first electrode is consumable and the second electrode is non-consumable. The welding system may include a control system in communication with the gas tungsten arc welder. The control system may include at least one current sensor to detect a current of the base metal and a bypass current. Also, the control system may include a plurality of resistors that will affect the value of a current to the gas tungsten arc welder. The resistors may comprise a plurality of adjustable power resistors controlled by a plurality of transistors connected in series with the gas tungsten arc welder.

In accordance with another aspect, a compact welder is disclosed. The compact welder may include a first welder having a gas nozzle including at least one aperture. It may also include a second welder having a portion engaging the aperture, wherein a first arc may form between one of the first and second welder and a base metal to be welded and a second arc may form between the first welder and the second welder.

In one embodiment, each welder includes a consumable electrode. In another embodiment, one of the first and second welder includes a consumable electrode and the other includes a non-consumable electrode. One of the first and second welder may be cooled with a fluid.

In accordance with another aspect, a method of welding is disclosed. The method may include providing a first electrical arc between a first electrode and a base metal. It may also include providing a second electrical arc between a second electrode and the first electrode. The method may also include using a control system to control the current through the base metal.

In one embodiment, the using a control system comprises using a plurality of power resistors controlled by a plurality of transistors. The using a control system may comprise sampling a current of the base metal, comparing the current of the base metal to a desired level, and activating or deactivating at least one of the plurality of transistors.

In accordance with another aspect, a method of controlling a welding system is disclosed. The method may include measuring a current of a base metal. It may also include calculating a resistance value for at least one resistor in electrical communication with a first welder having an electrical arc between a first electrode and a second electrode. The method may also include activating or deactivating a transistor in communication with the resistor.

In the following detailed description of the preferred embodiments, reference is made to the accompanying drawings that, form a part hereof, and in which is shown by way of illustrations, specific embodiments in which the invention may be practiced. These embodiments are described in sufficient detail to enable those skilled in the art to practice the invention and like numerals represent like details in the various figures. Also, it is to be understood that other embodiments may be utilized and that process, mechanical and/or other changes may be made without departing from the scope of the present invention.

DETAILED DESCRIPTION OF THE INVENTION

Figure 1:
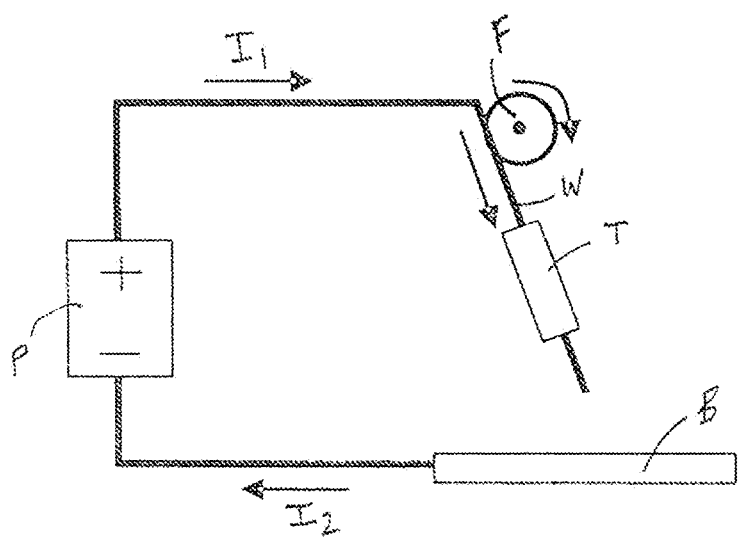
FIG. 1 is a schematic representation of a prior art GMAW system.

FIG. 1 illustrates a conventional, prior art GMAW system. In particular, the system includes a GMAW torch T that is in communication with a wire feeder F and a constant voltage power supply P. The power supply P provides a current to the torch T, so that, the wire W being fed from the wire feeder F may function as a consumable electrode as it is directed to a base metal B to be welded. In this configuration, a current $I_1$ is provided to the wire W. When the wire W completes the welding "circuit" (e.g. during the process of welding), a current $I_2$ flows through the base metal B. Due to the arrangement of this circuit, the current $I_1$ is equal to the current $I_2$. Accordingly, an increase in the current $I_1$ to the provided results in an equivalent increase in the current $I_2$ through the base metal B. As described in the formula in the "Background of the Invention," a user desiring to increase the welding speed (e.g., the melting speed of the wire W and deposition of the same) by increasing the current $I_1$ simultaneously increases the current $I_2$ through the base metal B. This increase in current through the base metal B increases heat and distortion of the base metal B. Hence, the user must compromise between the speed of the welding, quality of the weld, and the heat and distortion to the base metal B.

To overcome some of the limitations of conventional welding systems, an arc welder and related system for welding are herein disclosed. In its most general form, the present welder includes two electrodes for use in and control of the welding process. The welder and system enable increased welding productivity while allowing the current input in a base metal being welded to be independently controlled. Specifically, the welder and system allow for the decoupling of the current used to melt the welding wire from the current through the base metal being welded. This allows for a user to increase the melting current for the welding wire, which increases the deposition rate of the melted welding wire, without increasing the current to the base metal. Accordingly, the base metal current may be controlled at certain levels, while the current used to melt the welding wire is increased.

Figure 2:
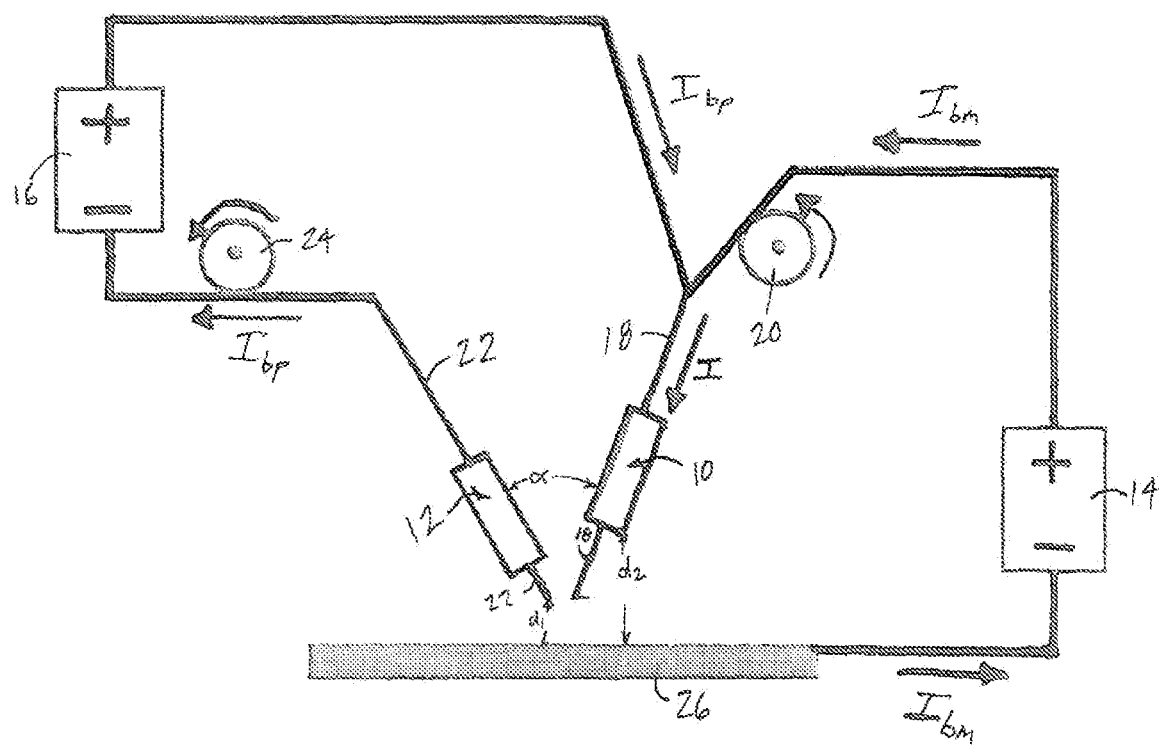
FIG. 2 is a schematic representation of one embodiment of a welding system.

Beginning with an overall discussion of one embodiment of the disclosed welding system, as shown in FIG. 2, the system includes a main GMAW torch 10 and a bypass GMAW torch 12. The main GMAW torch 10 is powered by a constant voltage ("CV") power supply 14, similar to a conventional single torch GMAW system. The bypass GMAW torch 12 is powered by a constant current ("CC") power supply 16 whose current can be set or otherwise adjusted by a user. The main GMAW torch 10 uses a consumable welding wire 18 as its electrode fed from a first wire feeder 20. The bypass GMAW torch 12 also uses a separate welding wire 22 fed from a second wire feeder 24 as its electrode. Although not shown, the two torches 10, 12 may be mounted in a fixture that can move in multiple axes with respect to the location of the base metal being welded. In the configuration shown in FIG. 2, the total melting current I of the first wire 18 consists of two parts: the bypass current $I_{bp}$ provided by the CC power supply 16 and the base metal current $I_{bm}$ provided by the CV power supply 14. Accordingly, the total, current to melt the first wire 18 can be expressed in the following formula:

$$I=I_{bm}+I_{bp}$$

The current which melts the second wire 22 is $I_{bp}$. The deposition rate is thus determined by $I_{bm}+2I_{bp}$.

Although the torches 10, 12 and power supplies 14, 16 may comprise any form of GMAW torches and suitable power supplies, in one embodiment, they comprise HOBART 8065 EXCEL-ARC CV/CC welders. Similarly, any form of suitable wire feeder may be used. In one embodiment, the wire feeders 20, 24 comprise a MILLER R115 and a HOB ART ULTRAFEED 1000 wire feeder.

The torches 10, 12 may be arranged in any way that allows for the desired decoupling of current. In one embodiment, the angle α between the main torch 10 and bypass torch 12 is acute and, preferably, less than or equal to 40°. The distance $d_1$ from the tip of the bypass filler wire to the base metal 26 is approximately 5 mm, while the distance $d_2$ from the contact tip of the main torch to the base metal 26 is approximately 25 mm. This enables an appropriate arc to be created between the electrodes (e.g., the welding wires 18, 22), while an arc is established between the tip of the main wire 18 and the base metal 26. One will appreciate that the bypass torch 12 and CC power supply 16 may be added to a conventional GMAW welding system. In other words, a preexisting welding system may be adapted to include the bypass torch 12 and CC power supply 16 in the configuration shown in FIG. 2, thus obviating the need to completely replace the conventional GMAW welding system.

In the configuration shown in FIG. 2, the main arc is created between the wire 18 and the base metal 26. Through the main arc, the bypass arc is established between the wire 18 of the main torch 10 and the wire 22 of the bypass torch 12. Thus, the main arc is established first. After that, the wire 22 of the bypass torch 12 may touch the main arc, thereby igniting the bypass arc.

Since the CV power supply 14 will adjust its current output to maintain a constant voltage between its two terminals, the main arc voltage can be maintained at the desired value automatically by the CV power supply 14. However, the bypass arc may be maintained by controlling its arc voltage at a level slightly higher (e.g., 1-3 volts) than the main arc voltage. The bypass arc system is similar to the constant voltage system where the welding current must be adjusted to maintain the constant arc length measured as the bypass arc voltage. To that end, the bypass current from the CC power supply 16 should be adjustable in order to match the given feed speed of the wire feeder 22 to maintain a continuous bypass arc. By modifying parameters of the bypass torch 12, such as wire feed speed and levels of the power supply, a user may control the base metal current $I_{bm}$, while not changing the total current I for the welding system. Accordingly, a user may increase the current I for the main torch 10, while maintaining the current $I_{bm}$ through the base metal at a desired level.

Figure 3A:
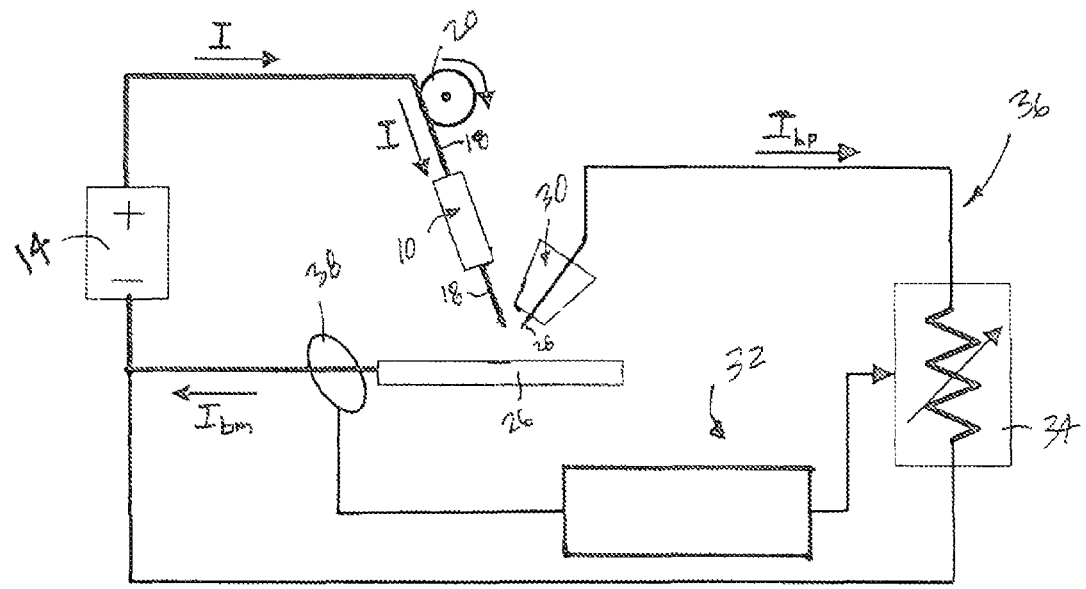
FIGS. 3a and 3b are a schematic representations of a second embodiment of a welding system.

In another embodiment, shown in FIG. 3, the GMAW bypass torch 12 is replaced with a non-consumable tungsten electrode 28 to decouple the melting current into the base metal current $I_{bm}$ and bypass current $I_{bp}$ expressed in the formula $I=I_{bm}+I_{bp}$, discussed above. The bypass current $I_{bp}$ flows back to the CV power supply 14 through the bypass torch without passing through the base metal 26. As a result, the base metal current $I_{bm}$ is no longer the same as the melting current I and the fundamental characteristics in conventional GMAW do not apply. The total melting current I is still determined by the wire feed speed and the welding voltage, as with conventional GMAW. However, the bypass arc can change and reduce the base metal current $I_{bm}$ without changing the total melting current I.

As shown, the system includes a main GMAW torch 10 and the non-consumable tungsten electrode 28, which may take the form of a gas tungsten arc welding ("GTAW") torch 30. Similar to the previously discussed embodiment, the GMAW torch 10 receives the welding wire 18 from the wire feeder 20, such that the wire 18 functions as a consumable electrode. However, unlike the previous embodiment, only a single CV power supply 18 is used in this configuration. Although any number of power supplies may be used in the system, a single power supply decreases the cost of the overall system. The system also includes a control system 32 with at least one adjustable resistor 34, as discussed below in further detail.

When the system is in use, the user can choose the wire feed speed based on the deposition rate desired. The total current I which melts the welding wire 18 will be dictated by the wire feed speed and the arc voltage setting. When the resistance of the adjustable resistor 34 is zero, the majority of the melting current I would tend to flow through the bypass loop 36 because the tungsten electrode 28 emits electrons easier than the base metal 26. To control the base metal current $I_{bm}$ at the desired level, the resistance of the adjustable resistor 34 is feedback adjusted using a current sensor 38 that measures the base metal current $I_{bm}$. Heat absorbed by the tungsten 28 and the resistor 34 is wasted. However, as opposed to this heat being directed to the base metal 26 or otherwise negatively impacting the welding process, the heat is absorbed by the bypass loop 36.

Figure 3B:
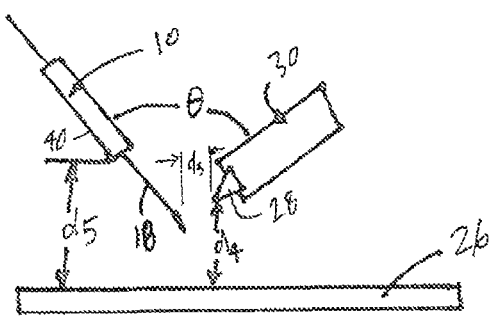

Although the main torch 10 and bypass tungsten electrode 28 may be relatively positioned in any desired configuration, FIG. 3b shows a preferred embodiment for the positioning of the torches. As shown, the horizontal distance $d_3$ from an end of the tungsten electrode to the end of the consumable electrode (welding wire) is approximately 2-5 mm. This range of distance provides a stable bypass arc between the tungsten electrode 28 and the consumable electrode (e.g., welding wire 18) without expediting the melt-off of the tungsten electrode 28. One will appreciate that, similar to the previously discussed embodiment, the present system may be created using a conventional GMAW welding system for the main torch 10 and CV power supply 14. Accordingly, existing welding systems do not need to be completely replaced, but adapted to include the additional components and configuration disclosed.

During the welding process, an arc is first created between the welding wire 18 of the main torch 10 and the base metal 26 before the second, bypass arc is created between the tungsten electrode 28 and the welding wire 18. In order to efficiently start the bypass arc, the distance $d_4$ between the tungsten electrode 28 and the base metal 26 is approximately 6 mm. To further assist in creating a stable bypass arc, the contact tube 40 of the main welder 10 is positioned a distance $d_5$ of approximately 20 mm above the base metal. Finally, the angle θ between the GTAW torch 30 and the main welder 10 is acute and, preferably, less than or equal to 60°. This angle θ allows for the main torch 10 to be placed in a normal work position, while still enabling the tungsten electrode 28 to point to the weld pool.

Figure 4:
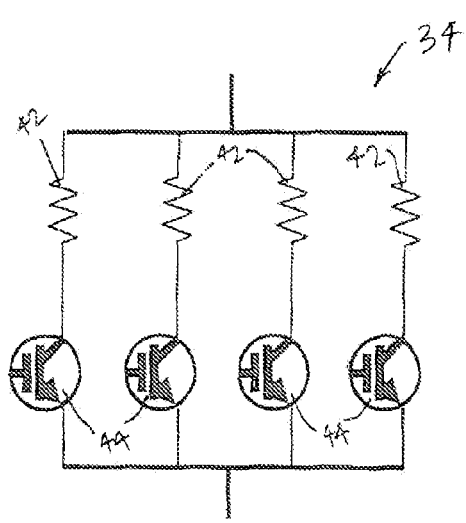
FIG. 4 is a schematic representation of a control system.

As previously mentioned, the welding system, also includes a control system 32. In one embodiment shown in FIG. 4, the control system 34 includes a plurality of resistors 42, such as a power resistors group controlled by a plurality of isolated gate bipolar transistors ("IGBTs") 44, a current sensor 38 (FIG. 3a) to detect the base metal current $I_{bm}$ and the bypass current $I_{bp}$, and a computer (not shown) to run software for the control system 32. The controllable power resistor group shown includes four individual, parallel power resistors 42, each controlled by an IGBT 44.

When the IGBT 44 is in an "on" configuration, the corresponding power resistor 42 will be used in parallel with the other resistors 42. The IGBTs 44 can be switched on/off in several milliseconds to choose the parallel power resistors 42 and adjust the resistance of the power resistor group. Assuming all four power resistors 42 have the same resistance, then the nominal resistance of the power resistor group is R/N, where R is the resistance value and N is the number of IGBTs 44 in the "on" configuration in the resistor combination. The possible nominal resistances are R/4, R/3, R/2, R, and infinite (when N=0). Since the power resistor group is connected in series with the GTAW torch 30, any change in resistance will affect the bypass current $I_{bp}$, and further affect the base metal current $I_{bm}$ because the total current I does not change when the wire feed speed and welding voltage are provided.

A control algorithm may be used with the power resistor group. The algorithm may run on a computer associated with the power resistor group. In one embodiment, the control algorithm includes the step of measuring the current of the base metal $I_{bm}$ and comparing it with a desired value set by a user. From this measuring and comparing, a required bypass resistance change ("Δr") may be calculated using the equation:

$$\Delta r = K \frac{r_o}{I_{bpo}} \delta I_{bm}$$

where K is the feedback control gain which must be greater than zero but not greater than 1 to assure the adjustment process to be stable. Preferably K should be between 0.6 and 0.8 to assure good adjustment speed with an assured stable adjustment process. $I_{bpo}$ and $r_o$ represent the values of the bypass current and resistance in the period during which the base metal current is measured and $\delta I_{bm} = I^*_{bm} - I_{bra}$, where $I^*_{bm}$ is the desired base metal current set by the user. Using the value for Δr, a new resistance is calculated as $r = r_o + \Delta r$. Taking this calculated resistance value r, a new resistor combination can be determined such that N=R/r. From this, the value N represents the number of IGBTs 44 that are placed in an "on" condition to obtain the required bypass resistance.

When N is not an integer, the resistance r=R/N is obtained using two different combinations;

$$r_1 = \frac{R}{\lfloor N \rfloor}$$

$$r_2 = \frac{R}{\lfloor N+1 \rfloor}$$

where $\lfloor \bullet \rfloor$ is an operator to return the integer part of N, and $\lfloor N+1 \rfloor = \lfloor N \rfloor + 1$. For example, when N is equal to 2.3, this operation will return 2 such that $\lfloor N \rfloor = 2$ and $\lfloor N+1 \rfloor = 3$. If T represents the control period for which the calculated new r is supposed to be implemented, the control algorithm will first output a resistor combination for $r_2$ for a period of $T_{R/\lfloor N+1 \rfloor}$ and then output, the resistor combination for $r_1$ for a period of $T_{R/\lfloor N \rfloor}$, where $T_{R/\lfloor N+1 \rfloor} + T_{R/\lfloor N \rfloor} = T$. To make sure the average resistance during the period T is r=R/N, these two periods are calculated as:

$$T_{R\lfloor N+1 \rfloor} = \frac{\lfloor N+1 \rfloor(N - \lfloor N \rfloor)}{N} T$$

$$T_{R\lfloor N \rfloor} = \frac{(\lfloor N+1 \rfloor - N)\lfloor N \rfloor}{N} T$$

and their ratio is:

$$\frac{T_{R\lfloor N+1 \rfloor}}{T_{R\lfloor N \rfloor}} = \frac{\lfloor N+1 \rfloor(N - \lfloor N \rfloor)}{(\lfloor N+1 \rfloor - N)\lfloor N \rfloor}$$

If N is an integer, the equations for $T_{R/\lfloor N+1 \rfloor}=0$ and $T_{R/\lfloor N \rfloor}=T$. Thus, an integer N is a special case to the above equations. In the control algorithm, it is not necessary to distinguish an integer N or non-integer N. For instance, if N=2, only the first two IGBT will be on for the whole control period T.

As an example, if N=2.3, one can obtain the following results: $\lfloor N \rfloor=2$, $\lfloor N+1 \rfloor=3$, $T_{R/3}=0.3913$ T, and $T_{R/2}=0.6087$ T. In the control period T, the IGBTs associated with the first three resistors will be ON for 39.13% of the period and the IGBTs with the first two resistors will be ON for the rest of the period (60.87% of the period). The average resistance in this period can be verified as 0.6087×R/2+0.3913×R/3=R/2.3, which is the needed resistance for the power resistor group.

Figure 5:
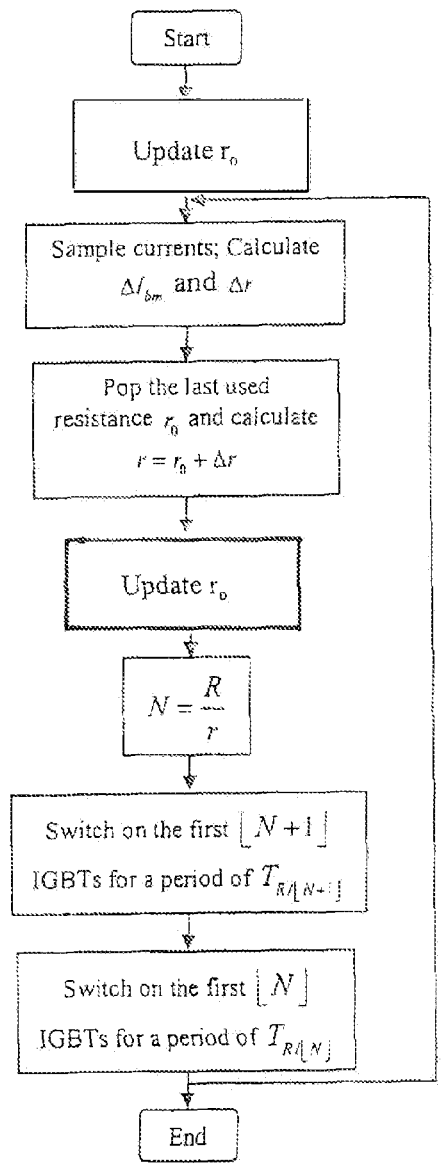
FIG. 5 is a flow chart of one embodiment of a control algorithm.

FIG. 5 illustrates a flowchart for one embodiment of die control algorithm that may be implemented using a computer running MATLAB SIMULINK. At step 100, update $r_o$ with the currently used resistance value. Next, the current of the base metal is measured and compared with a desired value set by a user (step 110). From this measuring and comparing, a required bypass resistance change Δr may be calculated using the equation discussed above (step 110). At step 120, r is calculated using the formula $r=r_o+\Delta r$. After calculating r, step 130 updates $r_o$ with the currently used resistance value.

Next, at step 140, N is calculated using the formula N=R/r. After that, the first $\lfloor N+1 \rfloor$ IGBTs are switched on for a period of $T_{R/\lfloor N+1 \rfloor}$ (step 150). At step 160, the first $\lfloor N \rfloor$ IGBTs are switched on for a period of $T_{R/\lfloor N \rfloor}$. The algorithm may then be restarted at step 110.

Various experiments have been conducted or are proposed/envisioned to demonstrate the above-described system. Details of such are provided in the following example. This example is for illustrative purposes only and is not limiting.

Example 1

A welding system was setup with a CV power supply, a GMAW gun, a water-cooled GTAW torch, and four 0.1 ohm power resistors controlled by four IGBTs. The tungsten electrode, protected by a water cooling system, had a diameter of 3.2 mm. Pure argon was used to shield the GMAW gun and GTAW torch. The gas flow rates for the GMAW gun and GTAW torch were 16.5 L/min and 7.1 L/min, respectively. The following parameters were used to determine the geometrical relationship between the GMAW gun, GTAW torch, and base metal: the distance from the GMAW contact tube to the base metal was set to 20 mm; the distance from the bypass electrode to the base metal was set to 5 mm; the distance between the bypass electrode and the electrode wire was set to 4 mm; and the angle between the electrode wire and the tungsten electrode was set to 60°. The base metal was a mild steel plate measuring 50×120×2 mm. A low-carbon welding wire (ER70S-6) with a diameter of 1.2 mm was used. The welding voltage was set to 35 v. The power resistor group consisted of four individual power resistors, each with a resistance of 0.1 ohm. Two current sensors were used to detect the base metal current and the bypass current. A control algorithm was implemented with MATLAB SIMULINK. This resulted in the total current for the system to be equal to the sum of the base metal current and the bypass current.

Also, the bypass arc voltage is nearly independent of the bypass arc current. When measuring a voltage between the GMAW gun and bypass GTAW torch, it was determined that the voltage is only slightly changed with a mean value of 27.5V and a standard deviation of 2.2 V, where there is a very large change in the bypass current. This voltage is the difference between the preset GMAW voltage and the voltage across the power resistors. With a constant GMAW voltage, it was concluded that the voltage across the adjustable power resistors only slightly changes with the bypass current.

Figure 6C:
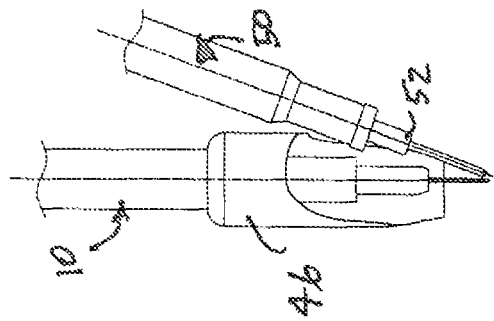
FIGS. 6a-6c relate to a compact welder design.
Figure 6B:
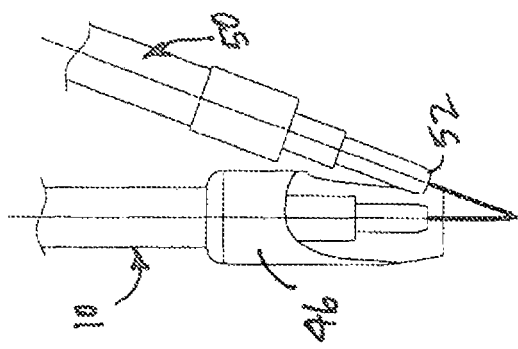
Figure 6A:
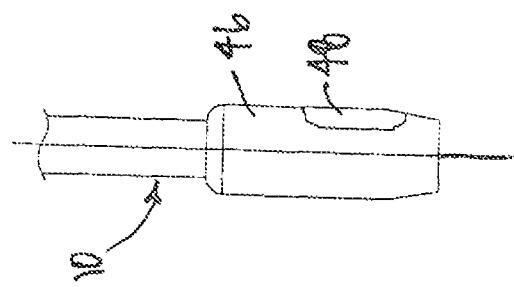

Instead of having the welding torches spaced apart from each other, they may be combined to form a compact welder or torch assembly. In one embodiment, shown in FIG. 6a, the compact welder includes a main welder 10 having a gas shielding nozzle 46 with at least one aperture 48 to receive at least a portion of a bypass welder 50. The aperture may be any desired size. As shown in the cutaway views in FIGS. 6a-6c, the bypass welder 50 does not include a gas shielding nozzle 46 and, instead, at least a portion of a contact tip 52 is placed in die aperture 48, so that the gas from the main welder 10 may shield both the main and bypass welders 10, 50. Configuring the bypass welder 50 without a gas shielding nozzle 46 allows for a more compact design and the ability to place the contact tip 52 of the bypass welder 50 at a desired angle and inside the aperture 48 of the gas shielding nozzle 46. The compact torch assembly may include any types of welding torches. For instance, both may be GMAW torches (FIG. 6b) or one may be a GMAW torch, while the other is a GTAW torch (FIG. 6c). Either of the torches may also be water cooled, if desired. In any arrangement, the compact welder may operate the same as the welding systems disclosed above.

Figure 7B:
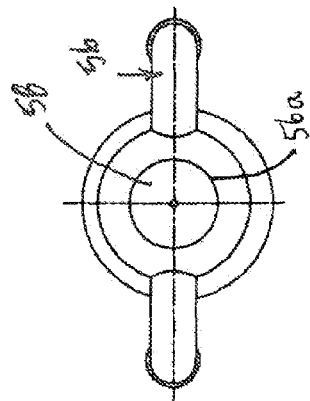
FIGS. 7a-7b relate to one embodiment of a welder and second electrode.
Figure 7A:
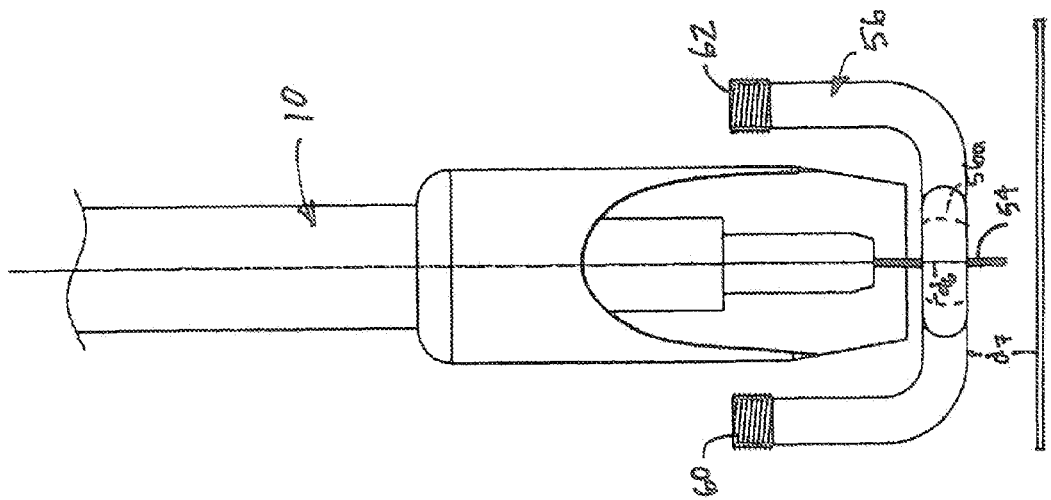

Besides use of the foregoing configurations of electrodes, the welding system may also use other configurations of electrodes. In one embodiment, shown in FIGS. 7a and 7b, the system includes a single, main welding torch 10 with a first electrode 54. A second electrode 56, without a torch, is positioned adjacent to the first electrode 54. Although the second electrode 56 may have any desired configuration and positioning with respect to the first electrode 54, as shown, the second electrode 56 is substantially ring shaped so that it completely surrounds the first electrode 54. In other words, the second electrode 56 may include an aperture 58 for receiving at least a portion of the first electrode 54. Preferably, the second electrode is positioned so that there is a distance $d_6$ approximately 1-3 mm between the first electrode 54 and the inner surface 56a of the second electrode 56. Also, the second electrode 56 is preferably positioned a distance $d_7$ approximately 7-12 mm above the base metal 26. The second electrode 56 is in electrical communication with a power supply (not shown), such that the second electrode 56 may be negatively charged. Accordingly, a first electrical arc may form between the first and second electrodes 54, 56 and a second electrical arc may form between the first electrode 54 and the base metal 26.

The second electrode 56 may be formed from any material, but would preferably be tungsten or copper tubing having an approximately 1 mm wall thickness. The use of tubing with a relatively thin wall allows for easy cooling of the second electrode 56 by introduction of a fluid. In one embodiment, fluid is delivered to the second electrode by a fluid pump (not shown). The fluid enters a first aperture 60 of the electrode, travels through the second electrode 56, and exits a second aperture 62, where the fluid may by cooled and reintroduced into the electrode 56 by the pump. Any fluid that assists with cooling the electrode may be used. In one embodiment, the fluid comprises a water and ethylene glycol mixture.

Similar to the previous embodiments of welding systems, the present embodiment enables the base metal current to be decoupled from the current for the main torch. As previously discussed, this allows a user to increase the melting current for the welding wire, which increases the deposition rate of the melted welding wire, without increasing the current to the base metal. As with the other embodiments disclosed herein, the second electrode 56 shown in FIGS. 7a and 7b can be used with a conventional welding system.

In summary, the present invention presents an arc welder and related system that allow for greater control of the welding process. The welder enables greater melting speeds of the welding wire, while allowing control of certain aspects of the base metal being welded. The welder and system are also capable of being used with conventional GMAW systems, thus obviating the need to completely replace existing welding systems.

The foregoing discussion was chosen to provide the best illustration of the principles of the Invention and its practical application to thereby enable one of ordinary skill in the art to utilize the invention in various embodiments and with various modifications suited to the particular use contemplated. Although there is a discussion herein of an arc forming between certain locations and/or components, one will appreciate that multiple arcs may form simultaneously or otherwise between these locations and/or components. All modifications and variations are within the scope of the invention as determined by the appended claims when interpreted in accordance with the breadth to which they are fairly, legally and equitably entitled.

What is claimed:

1. A welding system, comprising:
   a gas metal arc welder having a first electrode for forming a first arc between the first electrode and a base metal to be welded;
   a gas tungsten arc welder having a second electrode for forming a second arc between the second electrode and the first electrode, such that a value of a current through the base metal is less than a value of the current through the first electrode.

2. The welding system of claim 1, wherein the first electrode is consumable and the second electrode is non-consumable.

3. The welding system of claim 1, wherein the system includes a control system in communication with the gas tungsten arc welder.

4. The welding system of claim 3, wherein the control system includes at least one current sensor to detect a current of the base metal and a bypass current.

5. The welding system of claim 3, wherein the control system includes a plurality of resistors that will affect the value of a current to the gas tungsten arc welder.

6. The welding system of claim 5, wherein the resistors comprise a plurality of adjustable power resistors controlled by a plurality of transistors connected in series with the gas tungsten arc welder.

7. The welding system of claim 1 further including a single power supply for powering both electrodes.

8. The welding system of claim 1, further including a single power supply for creating each of the first and second arcs.

9. A welding system, comprising:
- a gas metal arc welder having a first electrode for forming a first arc between the first electrode and a base metal to be welded;
- a gas tungsten arc welder having a second electrode for forming a second arc between the second electrode and the first electrode; and
- a means for controlling the value of a current through the base metal at a level less than a value of the current through the first electrode.

10. The welding system of claim 9, wherein the controlling means includes at least one adjustable resistor.

11. The welding system of claim 10, wherein the controlling means further includes a current sensor for measuring the value of the current in the base metal.

12. The welding system of claim 11, wherein the controlling means includes a controller for comparing the value of the current in the base metal to a predetermined current value, and for adjusting the adjustable resistor to cause the measured current value to approximate the predetermined current value.

13. A welding system comprising:
- a gas metal arc welder having a consumable electrode for carrying a first current and for forming a first arc between the consumable electrode and a base metal to be welded; and
- a gas tungsten arc welder having a non-consumable electrode for carrying a second current and for forming a second arc between the non-consumable electrode and the consumable electrode;
- wherein the base metal carries a third current with a lower value than the first current, and wherein the sum of the second and third current is equal to the first current.

14. A welding system for use with a welding power supply, said system comprising:
- a gas metal arc welder having a first electrode for receiving a current from the power supply and for creating a first arc between the first electrode and a base metal to be welded; and
- a gas tungsten arc welder having a second electrode for receiving a first portion of the current from the first electrode and for forming a second arc between the second electrode and the first electrode;
- wherein the base metal receives a second portion of the current from the first electrode.

* * * * *